United States Patent [19]
Kittaka et al.

[11] Patent Number: 5,139,557
[45] Date of Patent: Aug. 18, 1992

[54] METHOD OF PERFORMING AN ION EXCHANGE OF OPTICAL GLASS

[75] Inventors: Shigeo Kittaka, Hyogo; Hiroshi Koshi, Kanagawa; Yoshikazu Kaite; Minoru Toyama, both of Hyogo; Noboru Akazawa, Kanagawa, all of Japan

[73] Assignee: Nippon Sheet Glass Co., Ltd., Japan

[21] Appl. No.: 744,830

[22] Filed: Aug. 13, 1991

Related U.S. Application Data

[63] Continuation-in-part of Ser. No. 507,881, Apr. 12, 1990, abandoned.

[30] Foreign Application Priority Data

Apr. 12, 1989 [JP] Japan .................. 1-92152

[51] Int. Cl.$^5$ ............................ C03C 15/00
[52] U.S. Cl. .................... 65/30.13; 501/64; 501/78
[58] Field of Search ............ 65/30.13, 30.14; 501/78, 64

[56] References Cited

U.S. PATENT DOCUMENTS

| | | | |
|---|---|---|---|
| 3,633,992 | 1/1972 | Furukawa et al. | 65/30.13 X |
| 3,666,347 | 5/1972 | Kitamo et al. | 65/30.13 X |
| 4,495,298 | 1/1985 | Yamagishi et al. | 501/78 X |
| 4,756,733 | 7/1988 | Houde-Walter et al. | 65/30.13 |

FOREIGN PATENT DOCUMENTS

| | | | |
|---|---|---|---|
| 493819 | 1/1974 | Japan | 65/30.13 |
| 57-120901 | 7/1982 | Japan | 65/30.13 |

*Primary Examiner*—Robert L. Lindsay
*Attorney, Agent, or Firm*—Hill, Van Santen, Steadman & Simpson

[57] ABSTRACT

This invention relates to a method of performing an ion exchange of optical glass to produce an axial gradient index material having a good linear distributiion by bringing a glass body containing a monovalent cation component into contact with a medium containing a monovalent cation component and exchanging these cation components under a predetermined condition.

1 Claim, 11 Drawing Sheets

(COMPARATIVE EXAMPLE)

(COMPARATIVE EXAMPLE)

F I G. 19
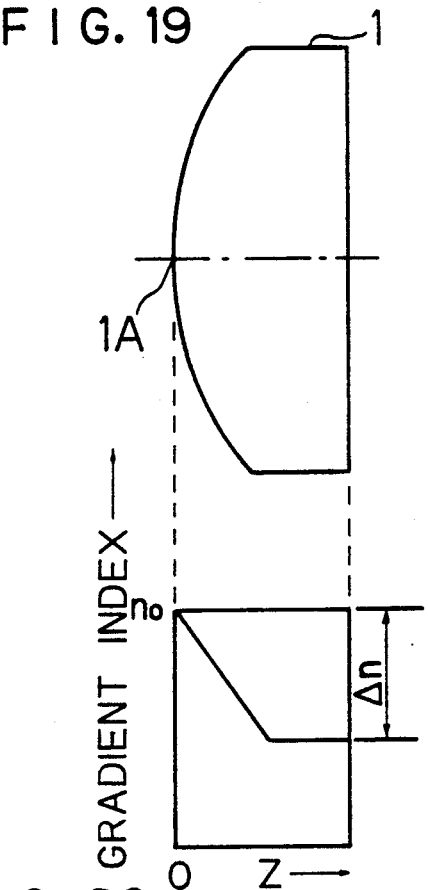
F I G. 20
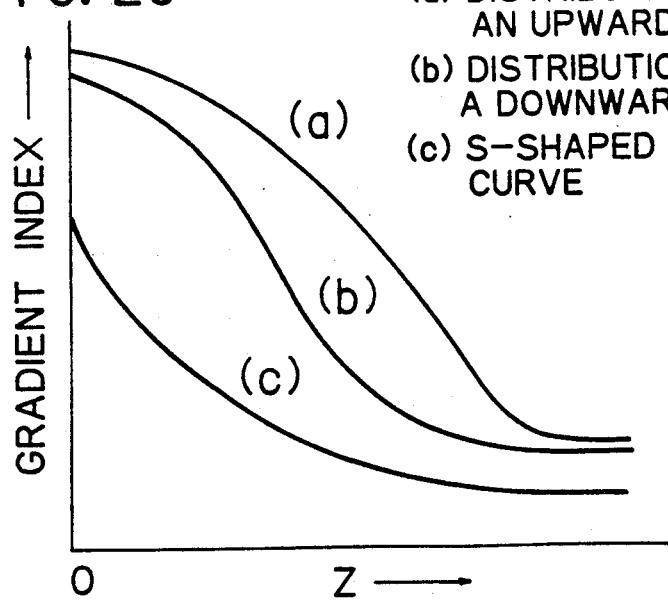
(a) DISTRIBUTION CURVE HAVING AN UPWARD CONVEX SHAPE
(b) DISTRIBUTION CURVE HAVING A DOWNWARD CONVEX SHAPE
(c) S-SHAPED DISTRIBUTION CURVE

METHOD OF PERFORMING AN ION EXCHANGE OF OPTICAL GLASS

This is a continuation-in-part of application Ser. No. 507,881, filed Apr. 12, 1990, abandoned.

BACKGROUND OF THE INVENTION

1. Field of the Invention

The present invention relates to a method of manufacturing optical glass having a gradient index and, more particularly, a method of manufacturing optical glass having a gradient index in a direction of the optical axis.

2. Prior Art

Optical glass is generally required to have a uniform refractive index. Optical glass and lens materials having gradient indices having controlled profiles have been developed and commercially available in recent years.

Gradient index lenses are classified into the following three types of lens:
Radial gradient index lens;
Axial gradient index lens; and
Spherical gradient index lens.

An example of the axial gradient index lens is shown in FIG. 19. A lens 1 has a gradient index monotonously decreased from a vertex 1A of its convex spherical surface to almost perfectly correct spherical aberration occurring on the convex spherical surface. A function for the axial gradient index can greatly enhance the aberrational correction by defining a refractive index $n(z)$ at a distance z, as shown in FIG. 19, as follows:

$$n(z) = n0 - kz \tag{1}$$

where n0 is the refractive index at the vertex 1A of the convex surface, z is the length in the direction of thickness along the optical axis when the vertex of the convex surface is defined as an origin, and k is a positive constant. The distribution defined by equation (1) is called a linear distribution hereinafter. In order to obtain a lens having excellent optical characteristics, axial gradient index glass having a linear distribution or a distribution close to a linear distribution is prepared, and the glass is formed into a lens. When a refractive index difference Δn shown in FIG. 19 is increased, freedom in lens design is increased to facilitate aberrational correction. Therefore, a larger refractive index difference Δn is preferred.

An ion exchange method is generally employed as a method of manufacturing axial gradient index glass. More specifically, a flat glass body containing a monovalent ion component is dipped in a molten salt such as $KNO_3$, $NaNO_3$ or $TlNO_3$ to form a concentration distribution of $Li+$, $Na+$, $K+$ or $Tl+$ ions in the glass body, thereby obtaining a gradient index corresponding to the concentration distribution.

Since, however, a monovalent ion exchange is a diffusion phenomenon, a gradient index obtained by the ion exchange method is not linear as shown in FIG. 19, but has one of the following distribution curves as shown in FIG. 20:

Distribution curve having an upward convex shape;
Distribution curve having a downward convex shape; and
S-shaped distribution curve.

Even if a glass material having such a gradient index is formed into a lens, it is difficult to correct the aberration.

OBJECT AND SUMMARY OF THE INVENTION

It is an object of the present invention to solve the conventional drawbacks described above and to provide a method of performing an ion exchange of optical glass to produce an axial gradient index material having a good linear distribution.

According to the extensive studies of the present inventors, when a composition of a monovalent cation component contained in a glass body and a composition of a monovalent cation component contained in a medium satisfied a predetermined condition, it was found that an axial gradient index having almost a linear index distribution could be obtained by the ion exchange method.

The monovalent ion component contained in the glass body serves to increase a refractive index. Of all the monovalent ion components, $Tl_2O$ has a maximum effect for increasing the refractive index. In order to obtain a large refractive index difference, it is most suitable to form a concentration distribution of $Tl_2O$.

In order to form a concentration distribution of $Tl_2O$ by the ion exchange method, the Tlhd 2O concentration in the glass body is set to be higher than the $Tl+$ concentration in the medium to decrease the $Tl_2O$ concentration on the glass surface, or the $Tl_2O$ concentration in the glass body is set to be lower than the $Tl+$ concentration in the medium to increase the $Tl_2O$ concentration on the glass surface.

Glass containing a large amount of $Tl_2O$ is unstable, and the latter method is therefore suitable.

Conditions to be satisfied by the glass and the medium prior to the ion exchange process will be described below.

As a total sum $M_2O (= Tl_2O + K_2O + Na_2O + Li_2O)$ of the monovalent cation concentration in the glass body is increased, a larger refractive index difference can be obtained, thus deriving the following condition:

$$8 \text{ mol } \% \leq M_2O \, (= Tl_2O + K_2O + Na_2O + Li_2O) \leq 30 \text{ mol } \% \tag{2}$$

If the total sum $M_2O$ is smaller than 8 mol %, a sufficiently large refractive index difference cannot be obtained. However, if the total sum $M_2O$ exceeds 30 mol %, chemical resistance of glass is degraded.

When a $Tl_2O$ component is contained in a glass body, a refractive index difference obtained by the ion exchange process is disadvantageously decreased. According to the extensive studies of the present inventors, when a $Tl_2O$ component was contained in a glass body in a predetermined amount, it was effective to contain $Tl_2O$ in the glass body in the following range to improve linearity of the gradient index:

$$0 \leq (Tl_2O) \leq 12 \text{ mol } \% \tag{3}$$

When the content of $Tl_2O$ is increased, the refractive index difference is decreased and at the same time an amount of relatively expensive $Tl_2O$ to be used is increased. Therefore, the content $Tl_2O$ preferably falls within the range of 0.9 mol % or less.

Other major monovalent cation components except for $Tl_2O$ are $Na_2O$, $K_2O$ and $Li_2O$. Of these components, when the content of $K_2O$ is increased, a glass transition point Tg of the glass body is increased. In this case, the temperature of the ion exchange process can also be increased, and the ion exchange process time can be advantageously shortened.

Glass forming components in addition to the monovalent ion component are silicates, borates and phosphates.

As a medium of the ion exchange, molten salts, e.g., nitrates, sulfates or chlorides can be used. Of these components, a nitrate (e.g., a mixed salt of $TlNO_3$, $NaNO_3$ and $KNO_3$) which can minimize glass erosion is suitable. When the content of $TlNO_3$ in the mixed salt is increased, a refractive index difference can be increased. When the content of $TlNO_3$ is excessively increased, linearity of the gradient index is degraded, and at the same time a decomposition reaction of $TlNO_3$ is excessively accelerated. Therefore, the $TlNO_3$ concentration falls within the following condition:

$$1 \leq TlNO_3 \leq 10 \text{ mol \%} \quad (5)$$

The above problem typically occurs when the content of $TlNO_3$ exceeds 10 mol %.

In order to suppress the decomposition reaction of the nitrate and minimize glass erosion, the content of $KNO_3$ must be increased to satisfy the following condition:

$$78 \leq KNO_3 \leq 99 \text{ mol \%} \quad (6)$$

In addition, when $NaNO_3$ is added to a salt mixture of $KNO_3$ and $TlNO_3$ within the following range:

$$0 \leq NaNO_3 \leq 12 \text{ mol \%} \quad (7)$$

linearity of the gradient index can often be improved.

The gradient index of the glass upon the ion exchange process under the above-mentioned conditions is almost linear in the direction of depth from the surface.

The range of $M_2O$ content is 8 mol % $\leq M_2O \leq 30$ mol % ($M_2O$ represents an oxide of a monovalent element).

$M_2O$ includes $Tl_2O$ as previously stated.

$N_{Tl}$ represents the ratio of $Tl_2O$ content to the whole of the $M_2O$ content.

$N_{Tl}$ is defined by equation (3) as $0 \leq NT_1 \leq 0.4$.

Thus, 30 mol % which is the maximum of $Tl_2O$ content $\times 0.4$ which is the maximum value of $N_{Tl}$ equals 12 mol %.

Similarly if $NT_1$ equals 0.3 30 mol % $\times 0.3 = 9$ mol %.

$M_2O$ comprises $Tl_2O$, $K_2O$, $Na_2O$ and $Li_2O$.

The total sum of $M_2O$ equals $Tl_2O + K_2O + Na_2O + Li_2O$.

$Tl_2O \leq 12$ mol %.
$1 \leq TlHO_3 \leq 10$ mol %.
78 mol % $\leq KNO_3 \leq 99$ mol %.
$0 \leq NaNO_3 \leq 12$ mol % and,
$1 \leq TlNO_3 \leq 10$ mol %.

BRIEF DESCRIPTION OF THE DRAWINGS

FIG. 19 is a view showing an axial gradient index lens;

FIG. 20 is a graph showing a gradient index which is not suitable for an axial gradient index lens;

DETAILED DESCRIPTION OF THE PREFERRED EMBODIMENT

The present invention will be described in detail below with reference to an embodiment shown in the accompanying drawings.

Figure 21:
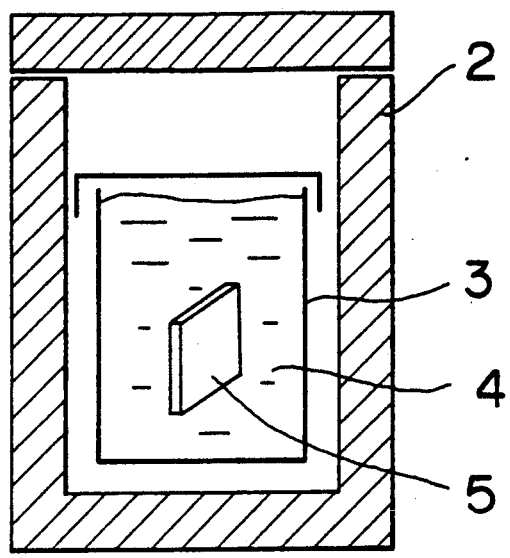
FIG. 21 is a view for explaining an ion exchange processing apparatus.

As shown in FIG. 21, a nitrate was placed in a stainless steel vessel 3 having a lid and a volume of about 1,000 ml and was heated in an electric furnace to obtain a molten salt 4. Preheated flat glass (50×60 ×3 mm) 5 was dipped in the molten salt 4 to perform an ion exchange process at a predetermined temperature. The flat glass 5 was kept upright by a stainless steel holder. Upon completion of the ion exchange, the flat glass 5 was taken out from the molten salt 4, gradually cooled, and washed with water. The gradient index of the flat glass 5 was measured as follows:

The flat glass was cut into about 20 pieces each having a size of 5×5 mm;

The surfaces (one major surface) of the pieces were cut by different depths (e.g., 0 μm, 20 μm, 40 μm, . . . ); and The cut surfaces were polished, and their refractive indices (λ=587.6 nm) were measured by a refractometer.

EXAMPLES

Figure 22:
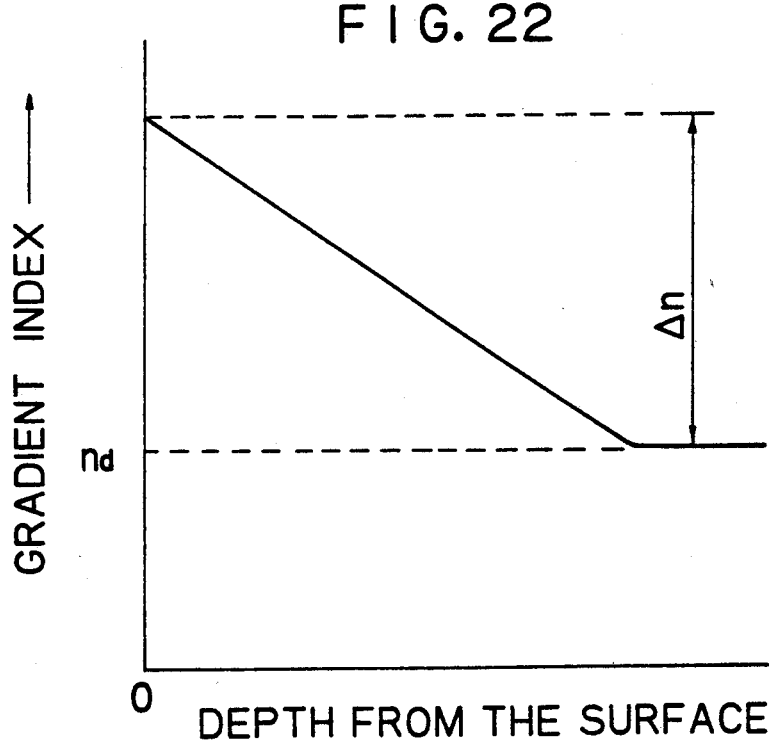
FIG. 22 is a graph for explaining $n_d$ and $\Delta n$ in Table 2.

Compositions of flat glass samples and their $N_{Tl}$ values prior to the ion exchange process are shown for Examples 1 to 16 in Table 1. The compositions of molten salts, ion exchange temperatures, ion exchange times, refractive indices $n_d$ of glass samples prior to the ion exchange process and refractive index differences $\Delta n$ after the ion exchange process are summarized in Table 2 (FIG. 22).

The gradient indices of the samples after the ion exchange process are almost linear, as shown in FIGS. 1 to 16. The samples can be used as materials for axial gradient index lenses.

COMPARATIVE EXAMPLES

Compositions of flat glass samples and ion exchange conditions are summarized for Comparative Examples 1 and 2 in Tables 1 and 2. The content of $TlNO_3$ of Comparative Examples 1 and 2 are 12 mol % each, and do not satisfy the following condition of the present invention:

$$1 \leq TlNO_3 \leq 10 \text{ mol \%}$$

Figure 1:
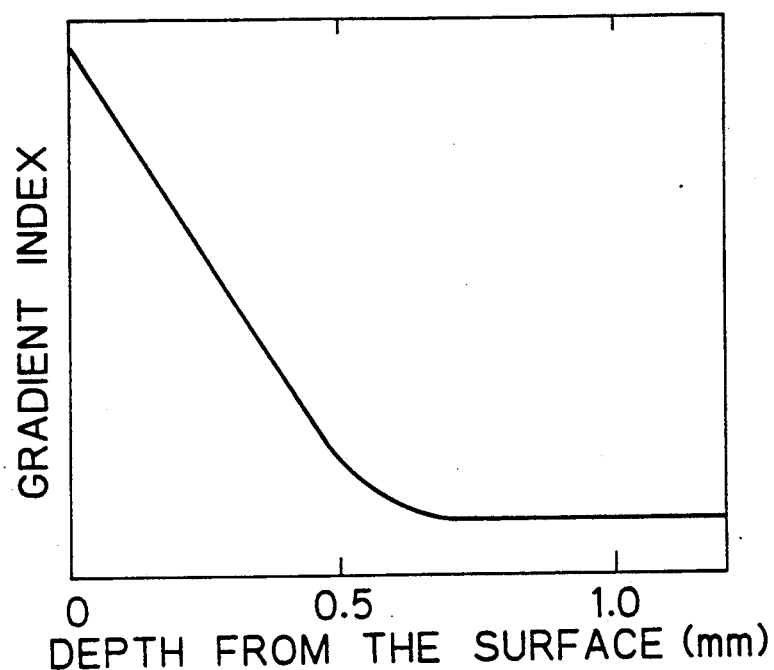
FIGS. 1 to 16 are graphs showing gradient indices of Examples 1 to 16 according to the present invention, in which a light wavelength is set to be 587.6 nm.
Figure 2:
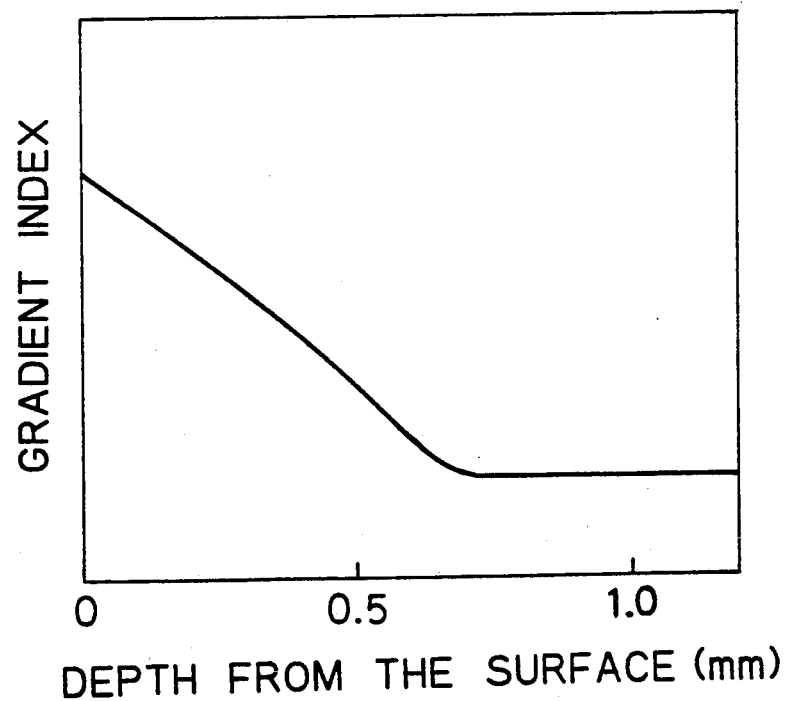
Figure 3:
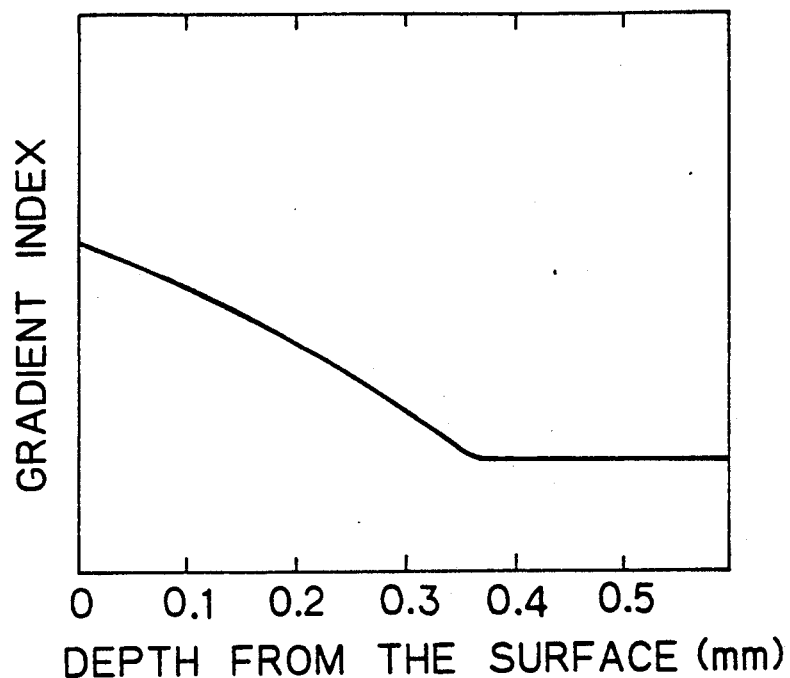
Figure 4:
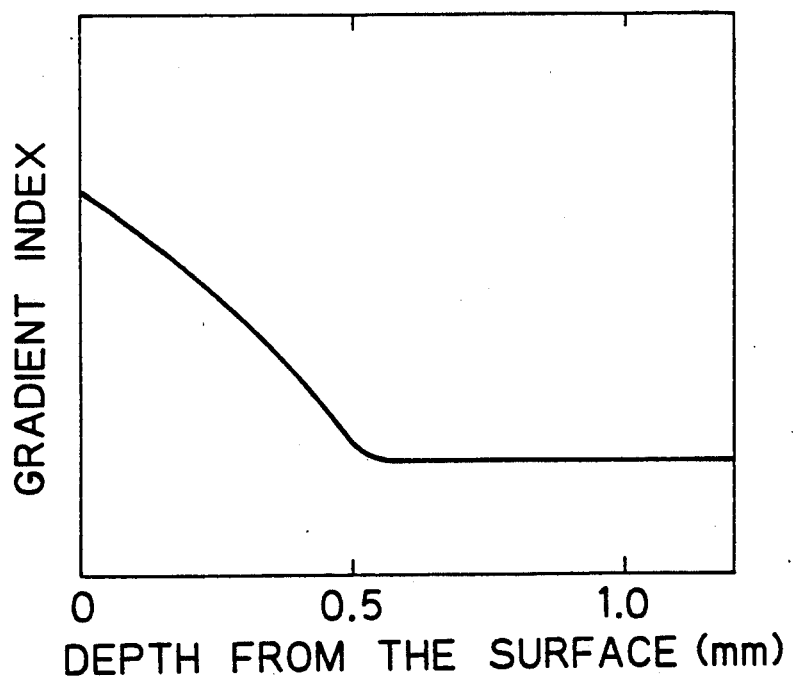
Figure 5:
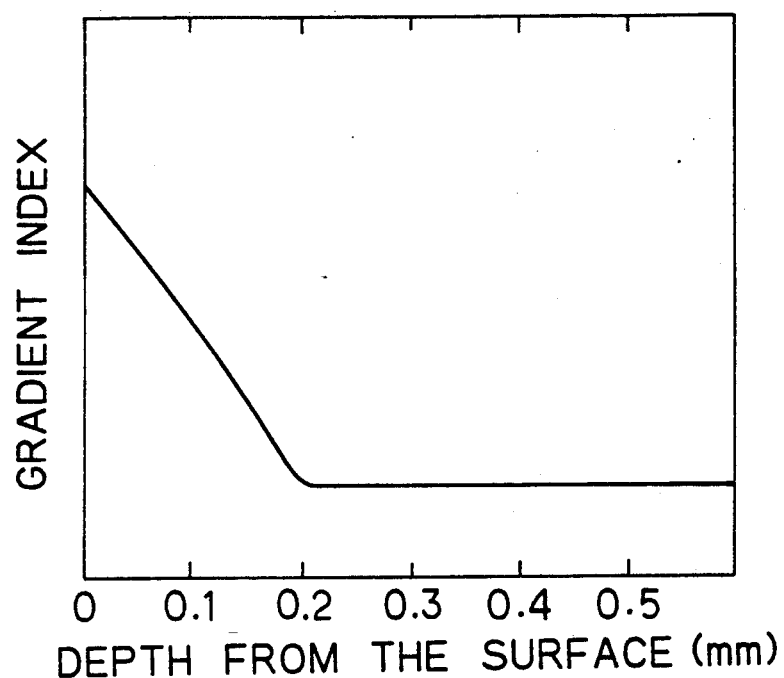
Figure 6:
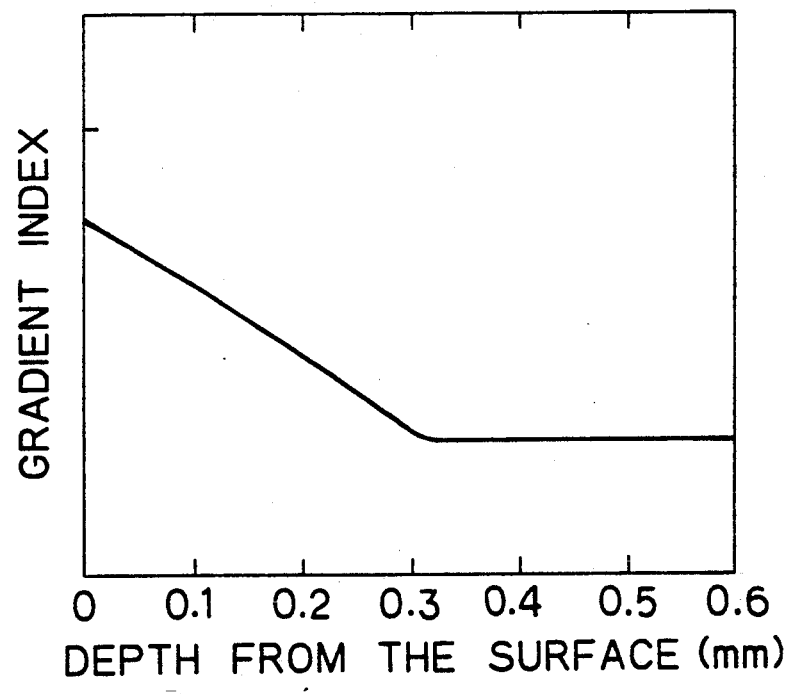
Figure 7:
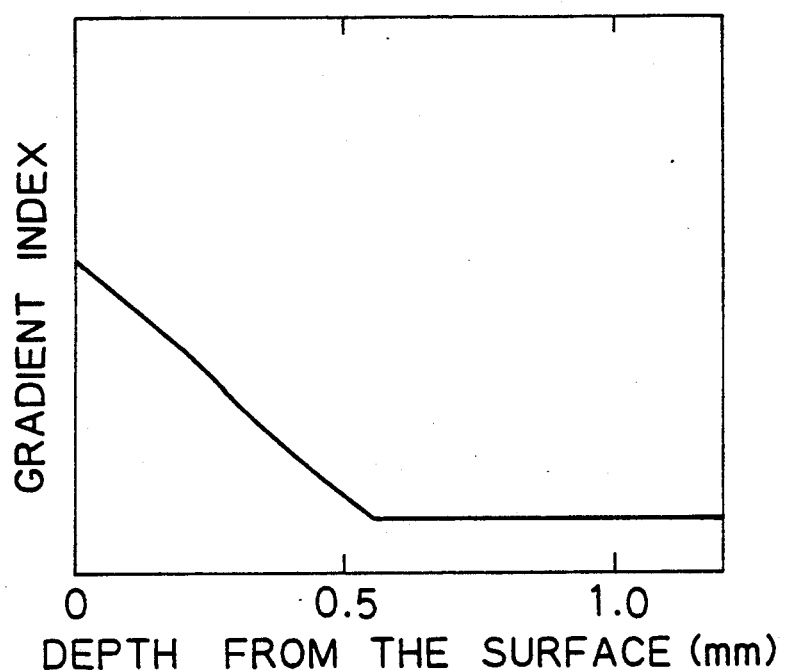
Figure 8:
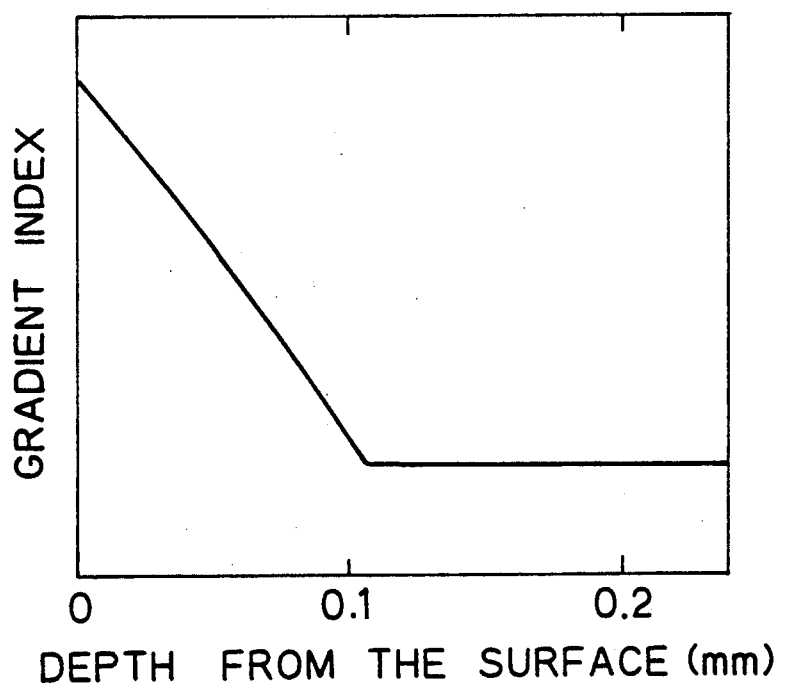
Figure 9:
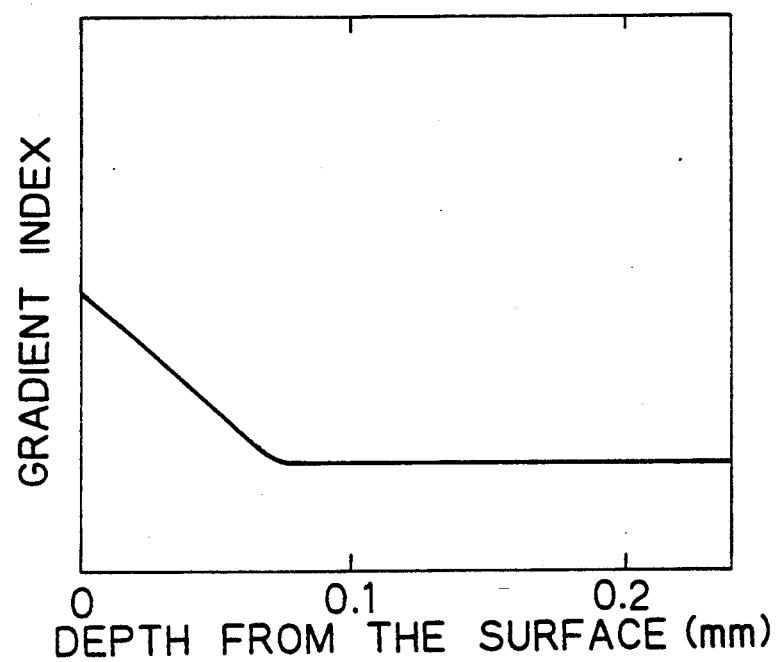
Figure 10:
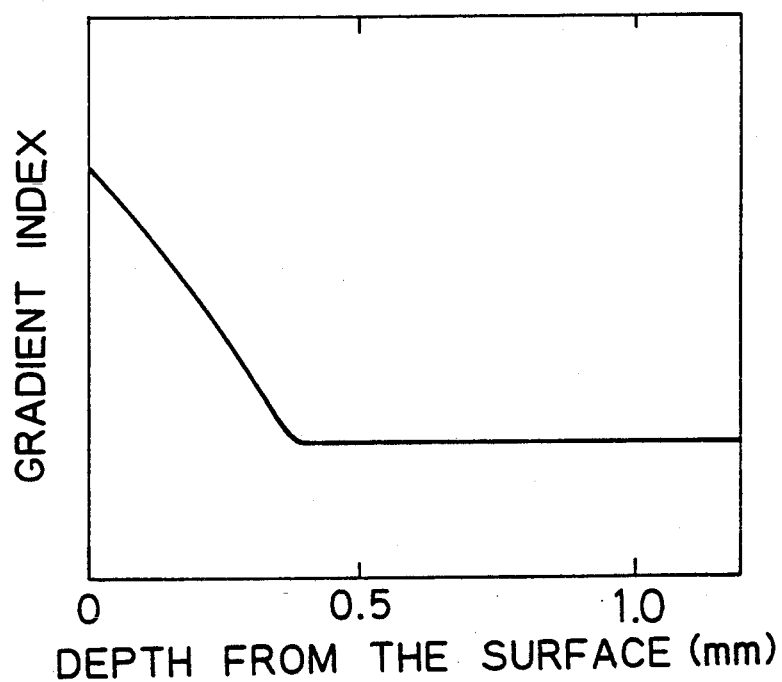
Figure 11:
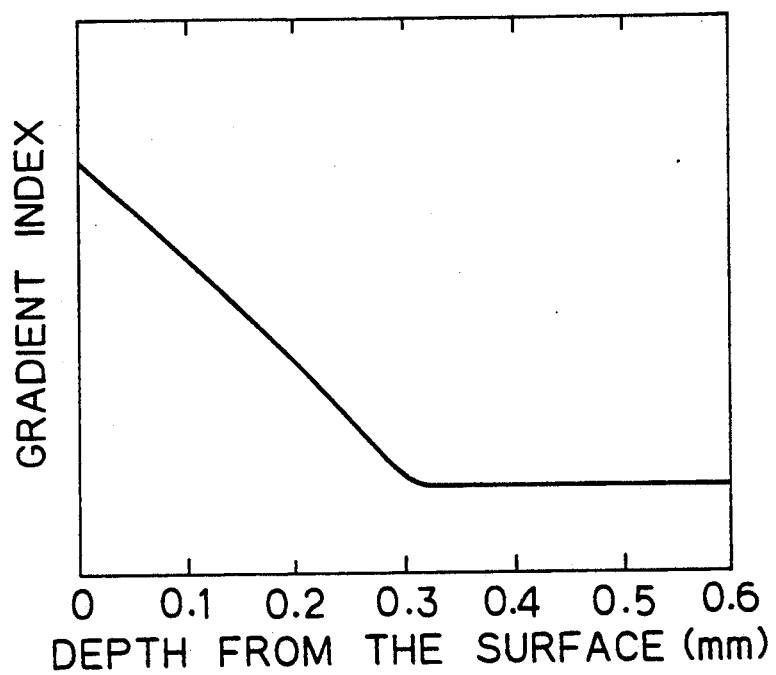
Figure 12:
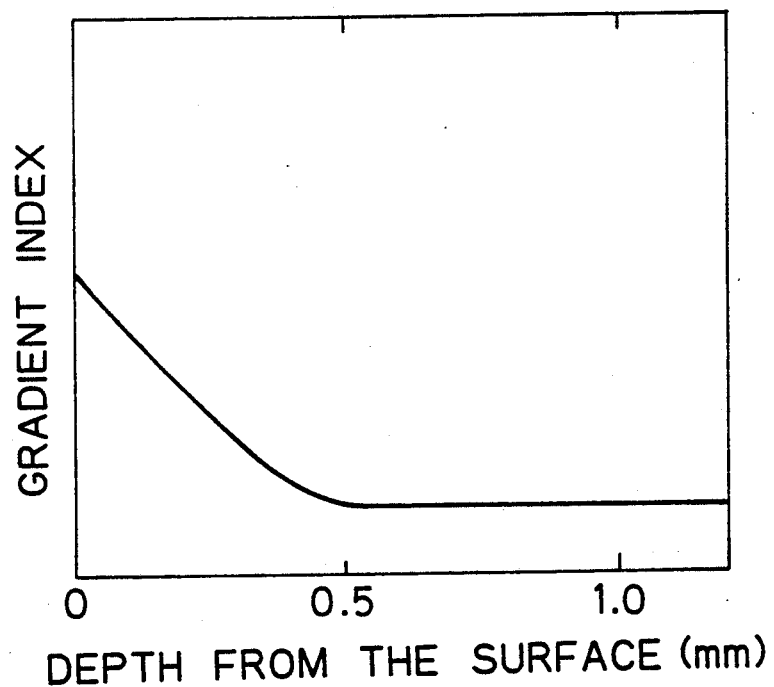
Figure 13:
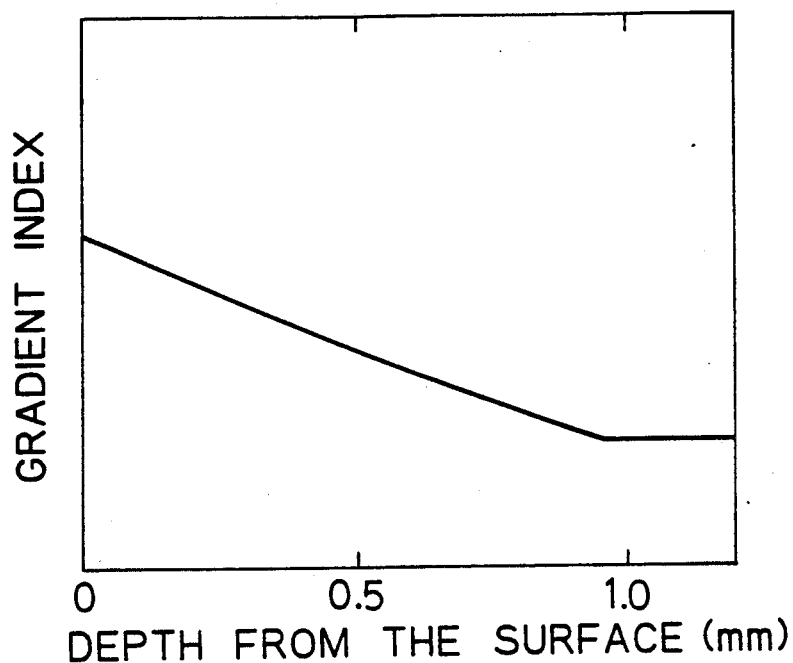
Figure 14:
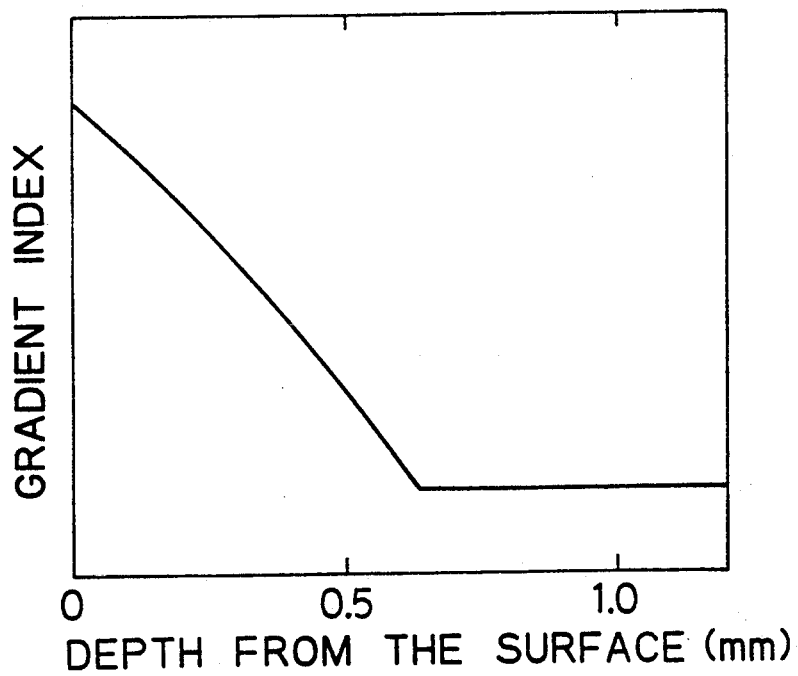
Figure 15:
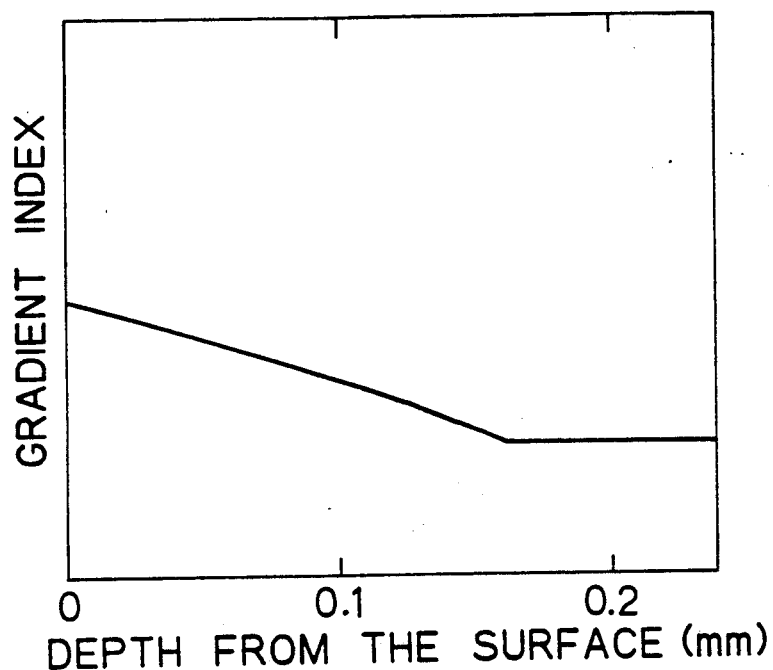
Figure 16:
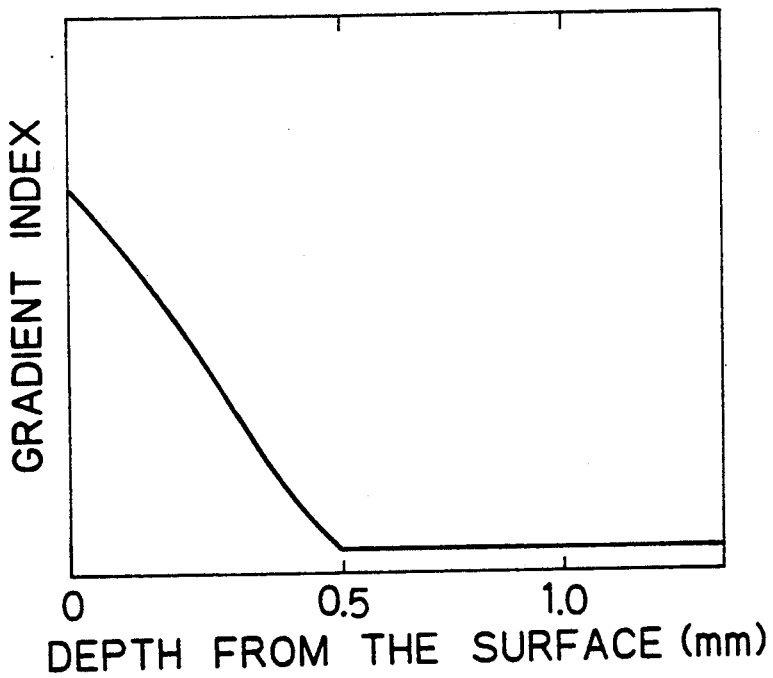
Figure 17:
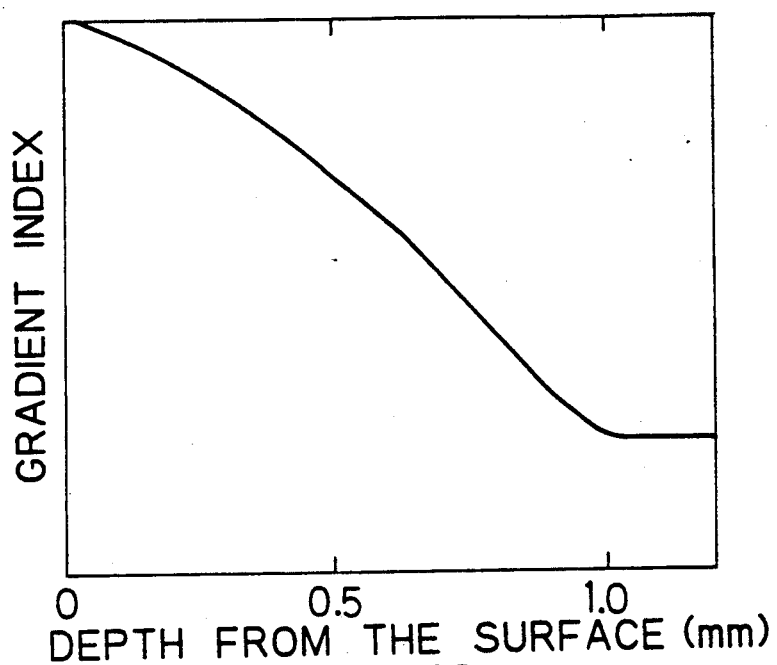
FIGS. 17 and 18 are graphs showing gradient indices of Comparative Examples 1 and 2 except for the present invention, in which a light wavelength is set to be 587.6 nm.
Figure 18:
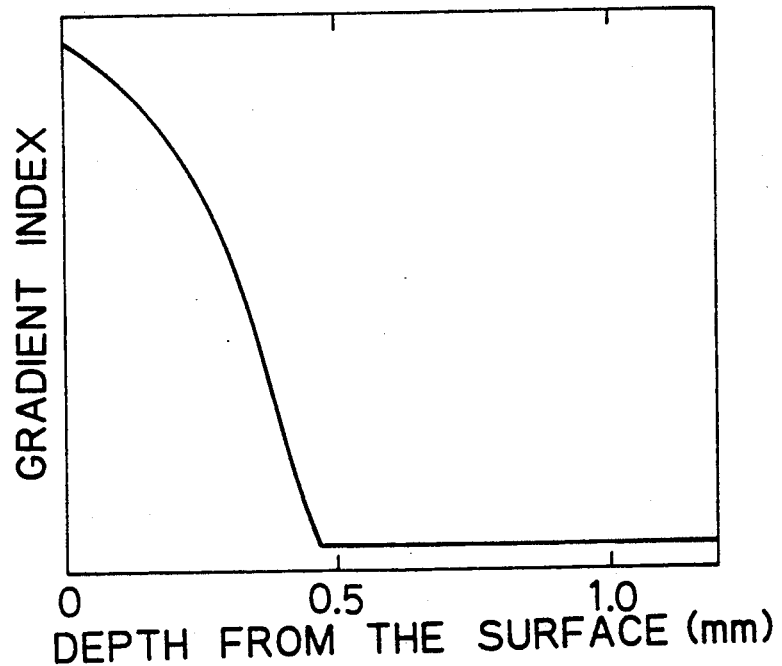

The gradient indices of Comparative Examples 1 and 2 are shown in FIGS. 17 and 18, respectively. Since the gradient index is greatly deviated from a straight line, these samples of Comparative Examples 1 and 2 are not suitable as materials for axial gradient index lenses.

TABLE 1

Unit: mol %

| Component | $SiO_2$ | $B_2O_3$ | MgO | CaO | ZnO | $ZrO_2$ | $Tl_2O$ ($N_{Tl}$) | $Na_2O$ | $K_2O$ | Other Components | Other Components |
|---|---|---|---|---|---|---|---|---|---|---|---|
| Example 1 | 55.0 | 5.0 | — | — | 20.0 | — | 4.0 (0.20) | 11.0 | 5.0 | — | — |
| Example 2 | 55.0 | 3.5 | 4.0 | — | 8.0 | 1.0 | 4.0 (0.16) | 14.0 | 4.0 | $Li_2O$ 3.5 | $TiO_2$ 3.0 |
| Example 3 | 53.0 | 3.5 | 4.0 | 4.0 | 9.0 | 1.0 | 4.0 (0.16) | 14.0 | 4.0 | $Li_2O$ 3.5 | — |
| Example 4 | 50.0 | — | 2.0 | 3.0 | 15.0 | — | 4.0 (0.20) | 10.0 | 6.0 | $GeO_2$ 10.0 | — |
| Example 5 | 57.0 | — | 5.0 | 5.0 | 10.0 | — | 3.0 (0.15) | 8.0 | 9.0 | $Al_2O_3$ 3.0 | — |
| Example 6 | 50.0 | 5.0 | 5.0 | — | 15.0 | 1.0 | 3.0 (0.14) | 6.0 | 6.0 | $Li_2O$ 7.0 | $Sb_2O_3$ 2.0 |
| Example 7 | 60.0 | 5.0 | — | — | 15.0 | — | 2.0 (0.10) | — | 18.0 | — | — |
| Example 8 | 53.0 | 5.0 | 10.0 | 10.0 | — | 2.0 | 2.0 (0.10) | 14.0 | 4.0 | — | — |
| Example 9 | 67.0 | 5.0 | 3.0 | — | 15.0 | — | 1.5 (0.15) | 2.5 | 6.0 | — | — |
| Example 10 | 55.0 | 5.0 | 5.0 | — | 15.0 | — | — | 14.0 | 6.0 | — | — |
| Example 11 | 53.0 | 5.0 | 10.0 | — | 10.0 | 1.0 | — | 10.0 | 10.0 | $Sb_2O_3$ 1.0 | — |
| Example 12 | 60.0 | 5.0 | — | — | 15.0 | — | 5.0 (0.25) | — | 15.0 | — | — |
| Example 13 | 61.0 | — | 3.0 | — | 10.0 | 1.0 | 4.0 (0.18) | 8.0 | 10.0 | PbO 3.0 | — |
| Example 14 | 61.0 | — | 3.0 | — | 10.0 | 1.0 | 4.0 (0.18) | 8.0 | 10.0 | BaO 3.0 | — |
| Example 15 | 50.0 | 5.0 | 5.0 | 8.0 | 7.0 | 1.0 | 3.0 (0.13) | 6.0 | 8.0 | $Li_2O$ 7.0 | — |
| Example 16 | 55.0 | 5.0 | — | — | 20.0 | — | 4.0 (0.20) | 11.0 | 5.0 | — | — |
| Comparative Example 1 | 61.0 | — | 3.0 | — | 10.0 | 1.0 | 4.0 (0.18) | 8.0 | 10.0 | PbO 3.0 | — |
| Comparative Example 2 | 55.0 | 5.0 | 5.0 | — | 15.0 | — | — | 14.0 | 6.0 | — | — |

According to the present invention, an axial gradient index material having a good linear distribution can be manufactured by the ion exchange process. Therefore, the present invention greatly contributes to the manufacture of axial gradient index lenses having excellent optical characteristics.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A method for producing axial gradient index materials having an approximate linear distribution, comprising the step of: immersing a glass body having a lens shape, said glass consisting of monovalent ion components, in an ion exchange medium with said medium consisting of ion components to exchange ions, wherein said glass body is optical glass, wherein the composition of said glass body consists of the following components by their approximate molar percentages;

| | |
|---|---|
| $SiO_2$ | 50–67 |
| $Tl_2O$ | 0~12 |
| $K_2O$ | 4~18 |
| $Na_2O$ | 0~14 |
| $Li_2O$ | 0~7 |
| $ZrO_2$ | 0~2 |
| $B_2O_3$ | 0~5 |
| MgO | 0~10 |
| CaO | 0~10 |
| ZnO | 0~20 |
| $GeO_2$ | 0~10 |
| $TiO_2$ | 0~3 |
| $Al_2O_3$ | 0~3 |
| $Sb_2O_3$ | 0~2 |
| BaO | 0~3 |
| PbO | 0~3 | wherein the total sum $M_2O$ of the monovalent ion concentration in said glass body prior to the ion exchange is in the range of 8~30 molar % and wherein $M_2O$ is equal to the sum of $Tl_2O$, $K_2O$, $Na_2O$, $Li_2O$, and wherein the sum of the components $B_2O_3$, MgO, CaO, ZnO, $ZrO_2$ BaO, and PbO in said glass is in the range of 16.5 to 27 mol %, wherein said ion exchange medium is a molten salt solution consisting essentially of $TlNO_3$, $KNO_3$, and $NaNo_3$, in the molar percentages, 1~10, 78~99, and 0~12, respectively.

* * * * *